Figure 1:
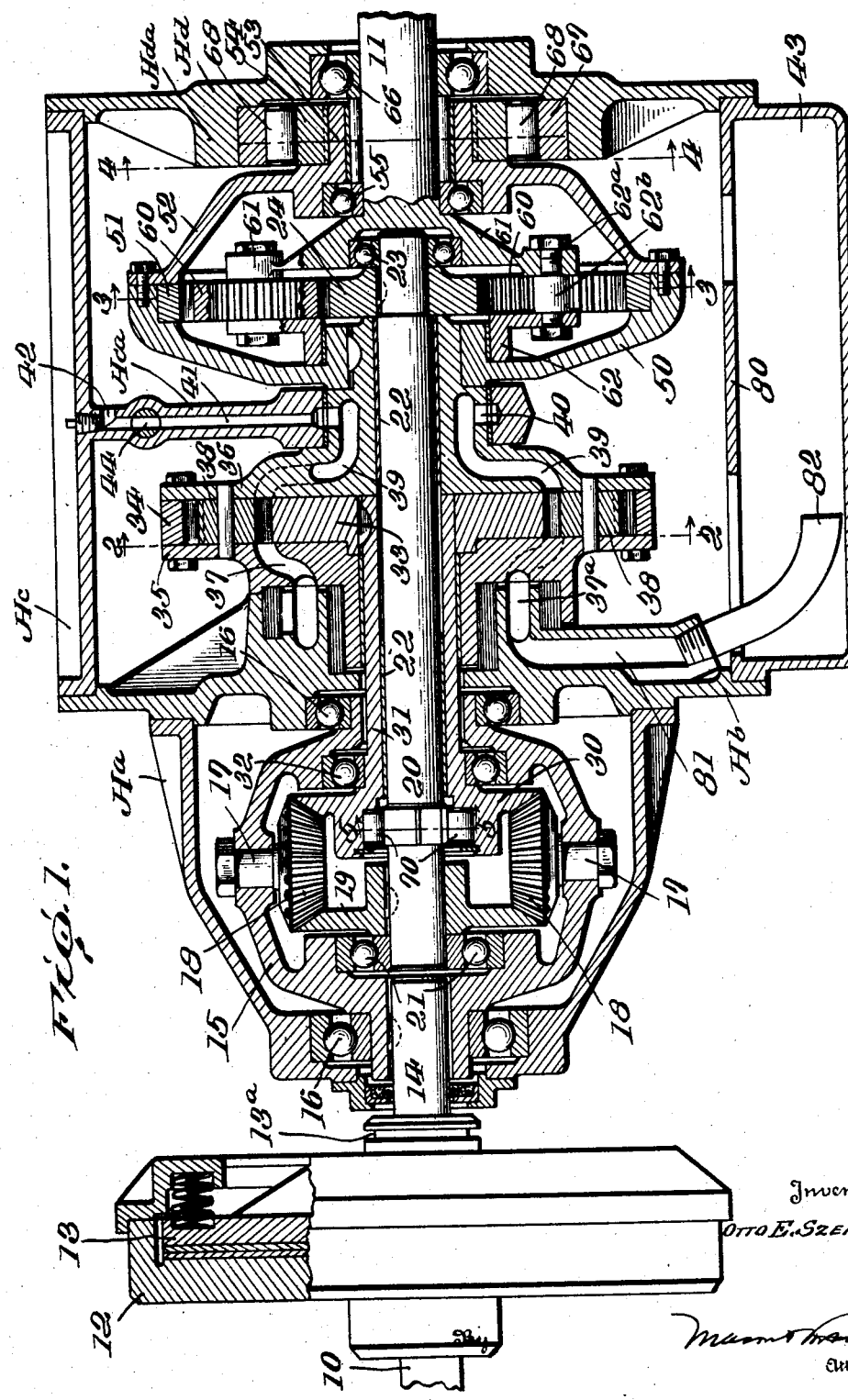

March 7, 1939.  O. E. SZEKELY  2,149,320

VARIABLE RATIO TRANSMISSION

Filed May 1, 1937  3 Sheets-Sheet 1

Inventor
OTTO E. SZEKELY

Attorneys

March 7, 1939.  O. E. SZEKELY  2,149,320
VARIABLE RATIO TRANSMISSION
Filed May 1, 1937   3 Sheets-Sheet 2
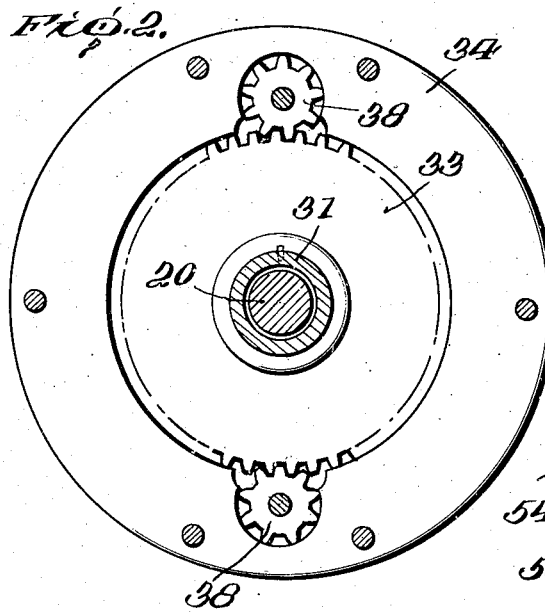
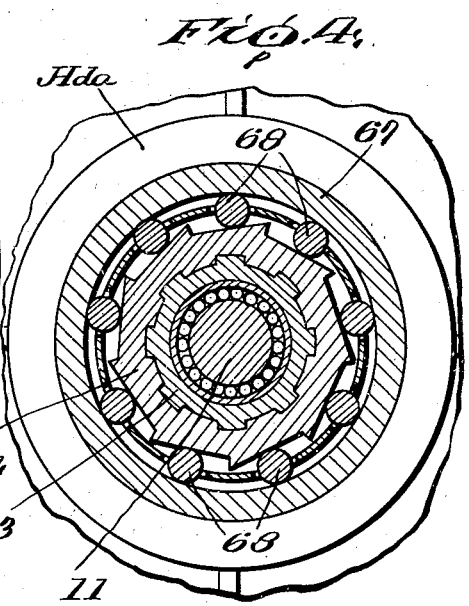
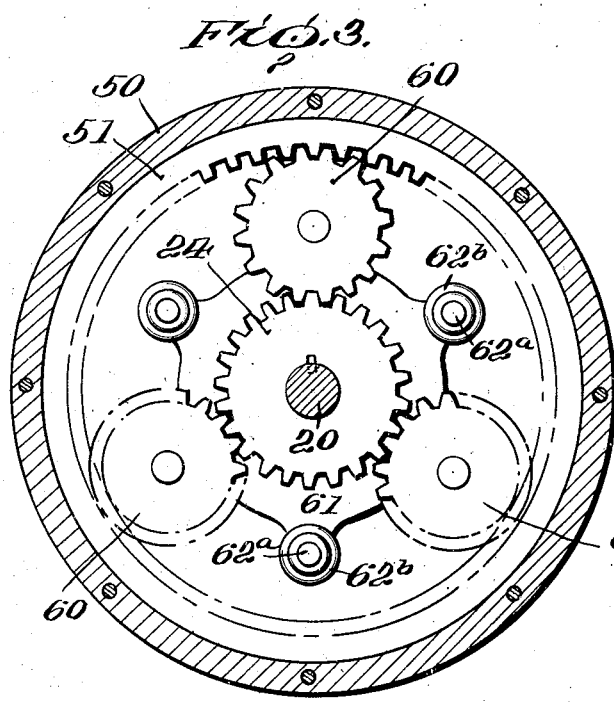
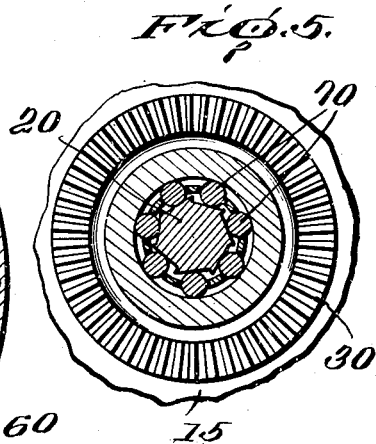
Inventor
OTTO E. SZEKELY

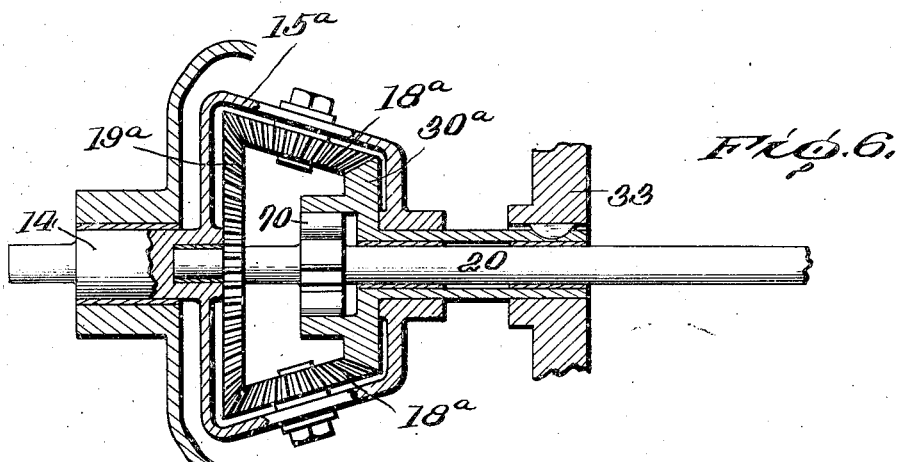
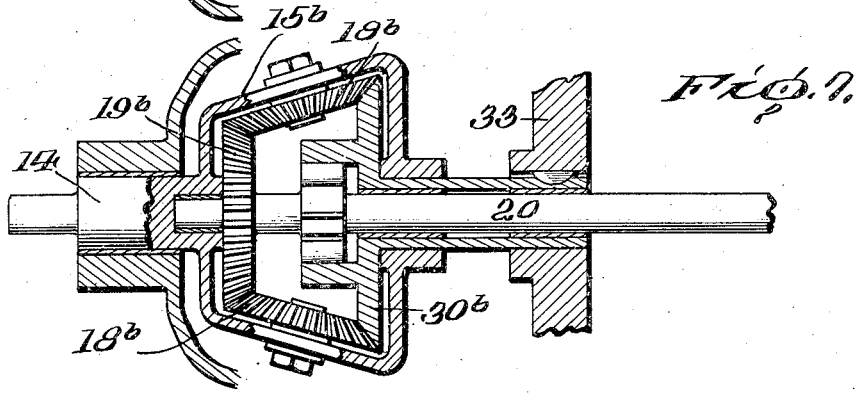
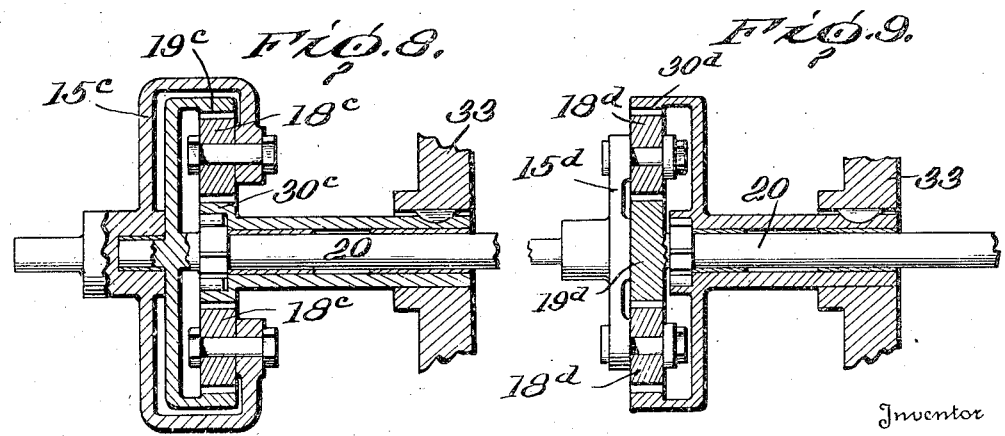

Patented Mar. 7, 1939

2,149,320

UNITED STATES PATENT OFFICE 2,149,320

VARIABLE RATIO TRANSMISSION

Otto E. Szekely, Elmira, N. Y., assignor to The Szekely Company, Inc., a corporation of New York Application May 1, 1937, Serial No. 140,229

13 Claims. (Cl. 74—293)

This invention relates to improvements in variable ratio transmissions and is concerned with mechanisms by which torque increment effects may be attained under automatic control by the load demand.

One of the features of the present invention is the provision of a structure by which plural ranges of torque ratio transmission may be effected, with inversely corresponding speed ratios, with the employment of a manual control for selecting the actuation in the system.

Another feature of the present invention is the provision of a structure including a plurality of power-transfer devices which may be successively brought into action in accordance with existing relationships of torque delivered by the prime mover and torque demanded by the load, and permitting the operator's control of the actuation effected therethrough.

Another feature of the present invention is the provision of a variable ratio transmission including two differentiating gear sets which are selectively energized and operate under plural conditions of energization for producing variable torque transfers through the structure.

Other features of the invention reside in the construction and arrangement of parts, as will appear more fully hereinafter.

Illustrative forms of practicing the invention are set out on the accompanying drawings, in which:

Fig. 1 is a longitudinal upright sectional view through a transmission assembly.

Figs. 2, 3, 4 and 5 are corresponding transverse sectional views, respectively taken substantially on the lines 2—2, 3—3, 4—4, and 5—5 of Fig. 1.

Figs. 6, 7, 8 and 9 are fragmentary detail views showing modifications in the construction.

In these drawings, the transmission mechanism is intended for transferring power from a shaft 10, which is coupled to any suitable prime mover (not shown), to a final driven or tail shaft 11 which is coupled to the load to be driven, so that the load places a torque demand upon this shaft 11. The driving or prime mover shaft 10 is shown as having a fly wheel 12 associated with a clutch structure 13 for driving a shaft 14. This shaft is keyed or otherwise secured to a differential case 15 which is freely rotatable on the anti-friction bearings 16 mounted in a front housing member Ha.

The differential case 15 has the inwardly extending pivot pins 17 which receive the planet pinions 18. The gear 19 is fixed on a shaft 20, this shaft being supported for rotation by the anti-friction bearings 21 disposed between it and the differential case, by the plain sleeve bearings 22, and by a further anti-friction bearing 23 at its rear end. The shaft 20 is keyed or otherwise secured to the central gear 24 of an epicyclic train. The second gear 30 in the differential case 15 is provided with a hollow shaft extension 31 which surrounds the shaft 20 and engages the plain bearings 22, and is supported thereby and also is mounted by the anti-friction bearing 32 for easy rotation in the differential case 15. The hollow shaft 31 is connected to the central gear 33 of a fluid displacement pump.

This fluid displacement pump includes the housing 34 located between the flanges 35, 36. The flange 35 has a peripheral channel groove 37 in its front face, for cooperation with a similar groove 37a provided in the end member Hb of the central housing portion Hc. Within the pump housing 34 are the pump pinions 38 which are mounted to turn about axes which travel with the pump housing assembly while the pinions 38 remain in mesh with the central pump gear 33. Fluid delivered from the pump passes through discharge channels 39 to a peripheral groove 40 formed in the hub of the right-hand flange 36, and thence to a corresponding groove in the web wall Hca of the housing member Hc, and thus gains access to a conduit 41 formed in this wall, and finally passes back by the conduit 42 into the sump 43 provided by the lower portion of the housing structure. Flow through the conduits 41, 42 may be regulated by a valve 44.

Keyed to the right-hand flange 36 of the pump structure is a member 50 provided with internally cut gear teeth 51. The member 50 is fixedly connected to a dished plate structure 52 which has a sleeve 53 onto which is fixedly secured a core 54 of an overrunning clutch assembly, as will be described in greater detail hereinafter. The plate 53 has an anti-friction bearing 55 located between itself and the shaft 11.

Planet pinions 60 of an epicyclic set are in mesh both with the gear teeth 51 and with the teeth of gear 24, and are carried by pivots connected to the carrier spider 61 located at one face of the gears 24, 60, in association with a spider portion 62 located at the other face thereof and connected by the bolts 62a and spacing collars 62b. The carrier spider 61 is secured to or formed integral with the final driven shaft 11, and is in supporting relation with the shaft 20 by the aforesaid anti-friction bearing 23.

The tail or final driven shaft 11 is mounted by anti-friction bearings 66 on the end member Hd of the general housing. This end member also has an inwardly extending flange Hda to receive the hardened outer sleeve member 67 of the overrunning clutch: between the core 54 and the outer sleeve 67 are provided the clutch rollers 68.

A further clutch of the overrunning type is provided between the sun gear 30 and the outer surface of the shaft 20, and is made effective by the rollers 70.

The sump 43 is divided from the upper portion of the housing by an apertured partition 80. The channel 37 is in communication by a passage 81 and a duct 82 with this sump space.

The several parts of the housing are secured fixedly together so that it operates to retain a liquid therein. This liquid is usually an oil which is effective without change of physical condition at maximum and minimum temperatures of service.

The manner of operation of the structure is as follows:

When the prime mover is at a standstill, all parts of the transmission are likewise at a standstill, and it may be assumed that the valve 44 is open.

The clutch 13 may be opened and the prime mover set in motion. This permits the usual operations of starting the prime mover if it is a gasoline engine or other device which exerts only a low torque during the starting condition or when moving at very low speed.

When the prime mover has attained a desired speed, the clutch 13 may be closed. For the purpose of a simple explanation of the operation of the device, it will be assumed that at this instant the prime mover begins to deliver a constant torque at a particular speed: and that this torque and speed of the prime mover shaft 10 will be maintained during the operations of bringing the final driven shaft 11 to the same speed.

When the clutch 13 has been closed, the shaft 14 turns at the same speed as the shaft 10. Thus, the differential case 15 is likewise driven at this same speed, and the planet pinion pins 17 are carried in rotation about the common axis at this same speed. The overrunning clutch rollers 70 prevent the gear 30 from turning faster than the shaft 20, and thus overcome the tendency of the gear 30 to be turned at twice the speed of the differential case 15, while the gear 19 is held fast by reason of load resistance. Hence, the differential case 15, and the gear and planet pinion means providing the first differential gearing, turn as a unit: and the inner pump gear 33 and the small gear 24 of the epicyclic or second differentiating gearing are likewise turned therewith: all of these parts are therefore revolving at the speed of the prime mover. The small gear 24 produces a pressure upon the planet pinions 60 tending to turn these about their axes. This results in a relatively backward pressure exerted by the planet pinions 60 upon the gear teeth 51. Thus, when the shaft 20 and gear 24 are turning in a clockwise direction (Fig. 3), a pressure is being exerted upon the gear teeth 51 tending to force them in a counterclockwise direction, along with the associated structures 50, 52 and the pump housing. This retrograde movement of these parts, however, is prevented by the engagement of the rollers 68 of the overrunning clutch, and hence there is no retrograde rotation relative to the frame. Hence, the planet pinions 60 roll on the gear teeth 51 which are stationary, and the spider 61, 62 is carried along with the gear 24, and turns in a clockwise direction for driving the tail shaft 11. The speed ratio between the shafts 10, 14 and 20 (and gear 24) with respect to the tail shaft 11 may then be expressed by the formula:

Speed of tail shaft = R. P. M. shaft $20 \times \frac{E}{E+R}$ in which E represents the effective diameter of the gear 24, and R represents the effective diameter of the gear teeth 51. Thus, if gears 24 and 60 are of the same effective diameter, then gear teeth 51 have an effective diameter three times as great: and then the above equation indicates that the rotational speed of the tail shaft 11 is one-fourth of the rotational speed of the prime mover and of the shaft 20.

The torque ratio may be similarly computed, by the formula:

Torque at tail shaft = Engine torque $\times \frac{E+R}{E}$ and hence the torque at the tail shaft, with the stated relation of the gears 24, 51, is four times the torque delivered at the prime mover. It will be noted that the power and energy conditions remain the same, as these are represented by formulas involving the product of speed and torque.

Under the conditions stated, therefore, with the valve 44 open, a mechanical drive is effected at a definite low speed and at a multiplied torque: this reduction of speed and multiplication of torque being determined by the ratio of the gears 24, 51. This condition represents the maximum change of speed and torque by the system, and occurs even when no oil or other liquid is present in the system. The speed of the tail shaft varies directly with the speed of the engine, and hence the actuation of the load is functionally related directly to the prime mover characteristics of speed and torque. It will be noted, therefore, that this mechanical drive provides for initially accelerating a load, and for the delivery of greatly increased torque effects; and is available for propelling a vehicle, for example, even in the event of disruption in the hydraulic system. It may, advantageously, be used under the aforesaid condition of constant speed and torque at the engine, in propelling an automobile up a steep grade.

If such a vehicle then passes upon a lesser grade, the operator may move the valve 44 toward closed condition. Back pressure effects are thus set up at the gear pump. When these pressure effects exceed, for example, the pressure effects existing in the first differential and tending therein to rotate the gear 30 faster than the shaft 20, a condition corresponding to a variable middle ratio is attained. The inner pump gear 33 is retarded by this back pressure in the gear pump, so that it turns slower than the shaft 20, and therewith the gear 30 turns slower than the differential case 15. This occasions a rotation of the planet pinions 18 about their respective axes 17, and therewith causes an increase of the rotational speed of the gear 19 with respect to the differential case, so that the shaft 20 now turns faster than the differential case. As before, the shaft 20 rotates the gear 24 in the second differentiating gearing. The pressures existing in the gear pump are not sufficient to overcome the reaction pressures between pinions 60 and gear teeth 51 as applied through the clutch rollers 68 to the frame. Therefore, an acceleration is imparted to the pinions 60 so that the spider 61 and the tail shaft 11 are driven at a greater rate. Ultimately, under this condition of operation, the back pressure effect in the gear pump may be regarded as retarding the inner pump gear 33 until it is substantially stationary with respect to the pump housing. At this time, the gear 30 is substantially stationary. In the form shown in Fig. 1, the two gears 30, 19 are of the same effective diameter; and hence, under these conditions, the gear 19 is rotated at twice the speed of the differential case 15. Since the shaft 20 is now turning at twice the speed, the 4:1 speed reduction in the second gearing now brings the tail shaft 11 to a speed which is one-half of the speed of the prime mover. Correspondingly, the torque delivered to the tail shaft 11 is twice the torque delivered at the prime mover. Again, the relation of the speed and torque show that the prime mover is continuing to deliver energy at the same constant rate as stated above.

Under these conditions, it will be noted that action and reaction are present in the gear pump, by reason of the back pressure upon the liquid: so that essentially half of the torque is being delivered from the pump housing, through the members 50, 52, to the clutch rollers 68 and thence to the frame, but this torque component has no corresponding speed component, as the parts are at a standstill, and hence no power transfer (save obvious mechanical and hydraulic losses) is occurring in this control portion of the system.

It will be noted that this change from a condition of 4:1 torque ratio and a 1:4 speed ratio, existing at the "low speed" is determined by the setting of the valve 44, so long as the torque demand on the tail shaft 11 remains constant. Conversely, for a given valve setting, variations in the torque demand on the tail shaft 11 (as in passing from a steep hill to one of lesser grade) will result in the passage of the system to the aforesaid condition at which the torque ratio is, say, 2:1 and the speed ratio is 1:2.

If the road passes from the moderate upgrade to a level condition so that the torque demand drops still lower, then the reaction pressure in the gear pump becomes greater than the reaction pressure between the planet pinions 60 and gear teeth 51 as applied to the frame through the clutch rollers 68. The pump housing structure now remains locked or blocked, so that its parts turn at substantially the same speed. The system passes to this condition by starting a slow forward rotation of the pump housing and therewith of the members 50, 52, and the overrunning clutch rollers 68 now permit this forward movement of the parts. This condition continues with acceleration of the pump housing and the members 50, 52, until these parts are turning at prime mover speed; with further decrease of the torque ratio, and increase of the speed ratio, during the transition phase; until all parts are turning together and at prime mover speed. This represents a direct drive or 1:1 speed ratio and 1:1 torque ratio.

It will be understood that this condition is maintained so long as the load demand exactly corresponds to the output of the engine with respect to both speed and torque. If the prime mover is delivering a greater torque than is demanded by the load at this 1:1 ratio, the prime mover speeds up, in accordance with its own characteristics, until the torque and speed at the prime mover exactly correspond to the torque demand of the load at the identical speed. On the other hand, if the load increases, the ultimate result is a passage from the 1:1 ratio successively to the 2:1 torque ratio and then (if demanded by the load) to the 4:1 torque ratio, along with corresponding decreases of speed, if the prime mover torque and speed remain constant. If the prime mover torque and speed change, it is obvious that similar but not necessarily linearly-corresponding changes occur at the load.

In the above description, the differential member 15 has been referred to as a case: and the epicyclic member 61, 62 has been referred to as a spider. These terms are interchangeable: and have been employed for simplicity of description and claiming. Thus, the differentiating gearings each include three relatively movable members herein illustrated as comprising two gears on a common axis, these gears being in mesh with planet pinion means carried by the case or spider. The two beveled gears 19, 30 in Figure 1 and the corresponding gears 19a, 30a and 19b, 30b in Figures 6 and 7 are sometimes called sun gears: while the gear 24 in Figure 1 and gears 30c, 19d in Figures 8 and 9 are called central or sun gears, and gear teeth 51 of Figure 1, 19c of Figure 8, and 30d of Figure 9 are called internally cut or orbit gears. This nomenclature applies to the physical manufacture of the parts, and not to their relative positions and operations in a differentiating gearing; and it will be understood that the present invention, in its broadest aspect, is addressed to forms and their modifications, as set out in the drawings. It has been indicated above that the ratio of the gear 24 to gear teeth 51 may be adjusted to attain the desired torque and speed relationship. It is also possible to control such a relationship by having the gears 19, 30 of the first differentiating gearing of properly selected different effective diameters. Thus, in Fig. 6, the differential case 15a supports the planet pinions 18a, which are in mesh with a large gear 19a and a small gear 30a. In this form, the large gear 19a is fixed to the shaft 20; while the gear 30 is connected to the inner pump gear 33. In this structure, the gear 19a is not driven at twice the speed of the differential case 15a when the gear 30a is held at a standstill with the pump assembly, and hence a greater multiplication of torque occurs in the system, for a given relationship of the gear 24 and gear teeth 51.

An inverse condition is shown diagrammatically in Fig. 7, where the planet pinions 18b on the case 15b are in mesh with sun gears 19b and 30b, but with the gear 19b smaller than the gear 30b. In this case, the torque multiplication is less, with the same assumed relative sizes of parts in the second differentiating gearing.

It is likewise possible to construct the first differentiating gearing of strictly epicyclic type, as shown by Figs. 8 and 9.

In the form of Fig. 8, the differential case 15c supports the planet pinions 18c which are located in the same plane and are in mesh with the small gear 30c and the large, internally cut gear 19c. This arrangement of parts corresponds to that of Fig. 6, in producing a greater torque multiplication.

In the form of Fig. 9, the differential case 15d carries the planet pinions 18d which are in mesh with the large gear 30d and the small gear 19d.

The relative sizes of the coaxial gears in the first differential gearing are selected according to the requirements of the system. Thus the forms of Figs. 6 and 8 are advantageous for heavy duty vehicles such as trucks, where a slow acceleration from 1:4 to a 1:2 and then to a 1:1 speed ratio is permissible. With lighter vehicles, such as fast passenger automobiles, the forms of Figs. 7 and 8 provide for rapid accelerations between these particular ratios.

Structurally, the illustrated assembly is advantageous as it provides three compartments in a housing structure, these compartments receiving, in order from the front end, the first differential gearing, the fluid displacement pump structures, and the second differentiating gearing: and permit the employment of closely spaced bearings which are illustrated as of anti-friction type, for permitting the easy movement of the parts in respect to one another and the housing, at points where the parts perform relative movements during conditions of heavy load demand.

This is a hydraulically-controlled mechanically-driven transmission in which maximum loads to be moved respective to the various established gear ratios, actuated through and by a mechanical drive and the hydraulic end is used for the transfer of speed-torque ratios from one to the other.

The transmission can be employed for many purposes in driving stationary machinery and vehicles. It has particular advantages in association with prime movers having a torque characteristic representing a very low torque output at starting and at low speeds, and hence can be employed in automobile service with variable speed engines as well as with prime movers having a substantially constant speed during running, with varying torque output.

In the illustrated form, the invention has been shown as arranged for a prime mover of low torque characteristic at low speeds, such as an internal combustion engine. For such uses, it is advantageous to have the clutch 13 actuatable, and this is accomplished in any usual manner; for example, by engagement of the usual clutch fork (not shown) in the clutch groove 13a.

It is obvious that the invention is not limited solely to the forms of construction illustrated, but that it may be employed in many ways within the scope of the appended claims.

I claim:

1. A variable ratio transmission comprising a frame, a driving member, a driven member; first and second differentiating gearings each comprising first and second gears having a common axis, a planet pinion and a differential member revoluble with the planet pinion about the common axis, the said first gears in each differentiating gearing being connected together, and fluid pressure means including two relatively movable parts respectively connected to the said second gears and effective for retarding the relative angular motion of said second gears; one said differential member being connected to the driving member and the other said differential member being connected to the driven member.

2. A variable ratio transmission comprising a frame, a driving member, a driven member; a first differential gearing having a pair of coaxial gears, a differential case and a planet pinion, said differential case being connected to the driving member; a second differential gearing having a pair of coaxial gears, a spider and planet pinion means, said spider being connected to the driven member; one gear in each differential gearing being connected together, means for preventing the other gear in one differential gearing from turning faster than said one gear thereof, means for preventing the other gear of the other differential gearing from turning backward relative to the frame; a gear pump having two relatively rotatable parts, one of said parts being connected to the said other gear in one differential gearing and the other said part being connected to the said other gear in the other differential gearing; and means for establishing a variable back pressure in said gear pump.

3. A variable ratio transmission as in claim 2, in which said back pressure establishing means includes conduit means for liquid circulation through the gear pump, and a valve in said conduit means for limiting the liquid delivery from said pump.

4. A variable ratio transmission comprising a frame, a driving member, a driven member; first and second differentiating gearings each comprising first and second gears having a common axis, a planet pinion and a differential member revoluble with the planet pinion about the common axis, the first gears in each differentiating gearing being connected together, and fluid pressure means including two relatively movable parts respectively connected to the said second gears and effective for retarding the relative angular motion of said second gears; one said differential member being connected to the driving member and the corresponding gears being of the same size, the other said differential member being connected to the driven member and the corresponding gears being of different sizes.

5. A variable ratio transmission comprising a frame, a driving member, a driven member; first and second differentiating gearings each comprising first and second gears having a common axis, a planet pinion and a differential member revoluble with the planet pinion about the common axis, the first gears in each differentiating gearing being connected together, both said differentiating gearings having their gears of different sizes, the large first gear in the first differential being connected to the small first gear in the second differential, and fluid pressure means including two relatively movable parts respectively connected to the second gears and effective for retarding the relative angular motion of said second gears; the differential member of said first differentiating gearing being connected to the driving member and the differential member of the second differentiating gearing being connected to the driven member.

6. A variable ratio transmission comprising a frame, a driving member, a driven member; first and second differentiating gearings each comprising first and second gears having a common axis, a planet pinion and a differential member revoluble with the planet pinion about the common axis, the first gears in each differentiating gearing being connected together, each differentiating gearing having its gears of different sizes, the small first gears of the two gearings being connected together, and fluid pressure means including two relatively movable parts respectively connected to the large second gears and effective for retarding the relative angular motion of said second gears; one said differential member being connected to the driving member and the other said differential member being connected to the driven member.

7. A variable ratio transmission comprising a housing, a driving member, a driven member; a first differential including first and second gears, a differential case, and a planet pinion journalled on the differential case; a fluid displacement pump including a pump housing, an inner pump gear, and a pump pinion journalled in the pump housing in mesh with the pump gear; a second differential including large and small gears, a spider and a planet pinion journalled on the spider in mesh with said large and small gears; a first overrunning clutch effective between said first and second gears for preventing said second gear from turning faster than said first gear, a second overrunning clutch effective between said large gear and the frame for preventing said large gear from turning backward relative to the frame; and means for controlling the flow of fluid through said pump so that the back pressure thereat may be varied; said driving member being connected to said differential case, said first gear being connected to said small gear, said second gear being connected to said pump gear, said pump housing being connected to said large gear, said spider being connected to the driven member.

8. A variable ratio transmission including a frame, a driving member, a driven member; a first differentiating gearing connected to the driving member; means for limiting the relative movement of parts of said first gearing; a second differentiating gearing connected to the driven member and including gears of different sizes and planet pinions in mesh therewith; means mechanically connecting parts of said differentiating gearings in driving relation; further means including brake devices connecting other parts of said differentiating gearings, and devices for controlling the braking effect; and means for limiting the movement of said other parts in said second gearing relative to the frame.

9. A variable ratio transmission including a frame, a driving member, a driven member; a first differentiating gearing including first and second gears, a planet pinion in mesh therewith, and a differential case supporting the planet pinion and connected to the driving member; means for limiting the relative movement of said gears in the first gearing; a second differentiating gearing including small and large gears, a planet pinion in mesh with said small and large gears, and a differential spider supporting the latter planet pinion and connected to the driven member; said first and small gears being connected together; means for limiting the movement of said large gear relative to the frame; and variable brake means for restricting the relative movement of said second and large gears.

10. In a variable ratio transmission, a frame, a driving member, a driven member, two differentiating gearings each having three relatively movable elements including gears and planet pinion means in mesh therewith, at least one said gearing having its gears of differing sizes; one said gearing having an element thereof driven by the driving member and the other said gearing having an element thereof connected in driving relation with the driven member; means connecting another said element in each gearing together; and brake means including a first part connected to a further element in one of said gearings and a second part connected to a further element in the other of said gearings for controlling the relative movements thereof whereby to determine the ratio of power transfer through said connecting means from the driving to the driven member.

11. A transmission as in claim 10, and including means in one of said gearings for limiting differential movements of said elements thereof when actuated in one direction.

12. A transmission as in claim 10, including means for restraining an element of one of said gearings against retrograde movement relative to the frame.

13. A transmission as in claim 10, in which one of said gearings includes a member for preventing one gear from overrunning the other gear, and said other gearing includes means for restraining an element thereof against retrograde movement relative to the frame.

OTTO E. SZEKELY.